US006981489B2

(12) United States Patent
Petrone et al.

(10) Patent No.: US 6,981,489 B2
(45) Date of Patent: Jan. 3, 2006

(54) METHOD FOR CONTROLLING A FUEL INJECTOR ACCORDING TO A CONTROL LAW WHICH IS DIFFERENTIATED AS A FUNCTION OF INJECTION TIME

(75) Inventors: Michele Petrone, San Lazzaro Di Savena (IT); Luca Mancini, Bologna (IT); Massimo Mattioli, Castelmaggiore (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 368 days.

(21) Appl. No.: 10/455,559

(22) Filed: Jun. 5, 2003

(65) Prior Publication Data

US 2004/0065747 A1 Apr. 8, 2004

(30) Foreign Application Priority Data

Jun. 7, 2002 (IT) .......................... BO2002A0359

(51) Int. Cl.
*F04M 51/00* (2006.01)
(52) U.S. Cl. .................... 123/490; 239/585.1; 361/154
(58) Field of Classification Search ................ 123/490; 239/585.1; 361/154, 155
See application file for complete search history.

(56) References Cited

U.S. PATENT DOCUMENTS

| 4,238,813 | A | * | 12/1980 | Carp et al. ................... 361/154 |
| 4,511,945 | A | * | 4/1985 | Nielsen ....................... 361/154 |
| 4,631,628 | A | * | 12/1986 | Kissel ......................... 361/154 |
| 4,778,107 | A | | 10/1988 | Kojima et al. ................. 239/1 |
| 5,381,297 | A | | 1/1995 | Weber ......................... 361/153 |
| 5,430,601 | A | * | 7/1995 | Burcham ...................... 361/154 |
| 5,941,216 | A | * | 8/1999 | Arakawa ...................... 123/490 |
| 6,318,646 | B1 | | 11/2001 | Mattioli et al. ........... 239/585.1 |
| 6,367,719 | B1 | * | 4/2002 | Wright ..................... 239/585.1 |
| 6,457,457 | B1 | * | 10/2002 | Harcombe ................... 123/490 |
| 6,571,773 | B1 | * | 6/2003 | Yamakado et al. ......... 123/490 |
| 6,832,601 | B2 | * | 12/2004 | Watanabe et al. ........... 123/490 |
| 2003/0132321 | A1 | | 7/2003 | Maier et al. ............. 239/585.1 |

FOREIGN PATENT DOCUMENTS

| EP | 0 889 223 | 1/1999 |
| EP | 1 076 0175 | 2/2001 |
| EP | 1 201 898 | 5/2002 |
| WO | WO 95/00960 | 1/1995 |
| WO | WO 02/44547 | 2/2002 |

* cited by examiner

Primary Examiner—John T. Kwon
(74) Attorney, Agent, or Firm—Baker & Daniels

(57) ABSTRACT

A method for controlling a fuel injector provided with an electrically operated electomagnetic actuator in such a manner as to open the injector for a determined injection time; the method providing that the injector be operated with a first current waveform if the injection time is greater than a predetermined threshold value, and that the injector be operated with a second current waveform if the injection time is less than the predetermined threshold value; both the current waveforms have an identical initial portion, during which the current passing through the injector is caused to rise until it reaches a peak value, which is maintained by cyclic switching of the voltage applied to the injector between two different values.

29 Claims, 4 Drawing Sheets

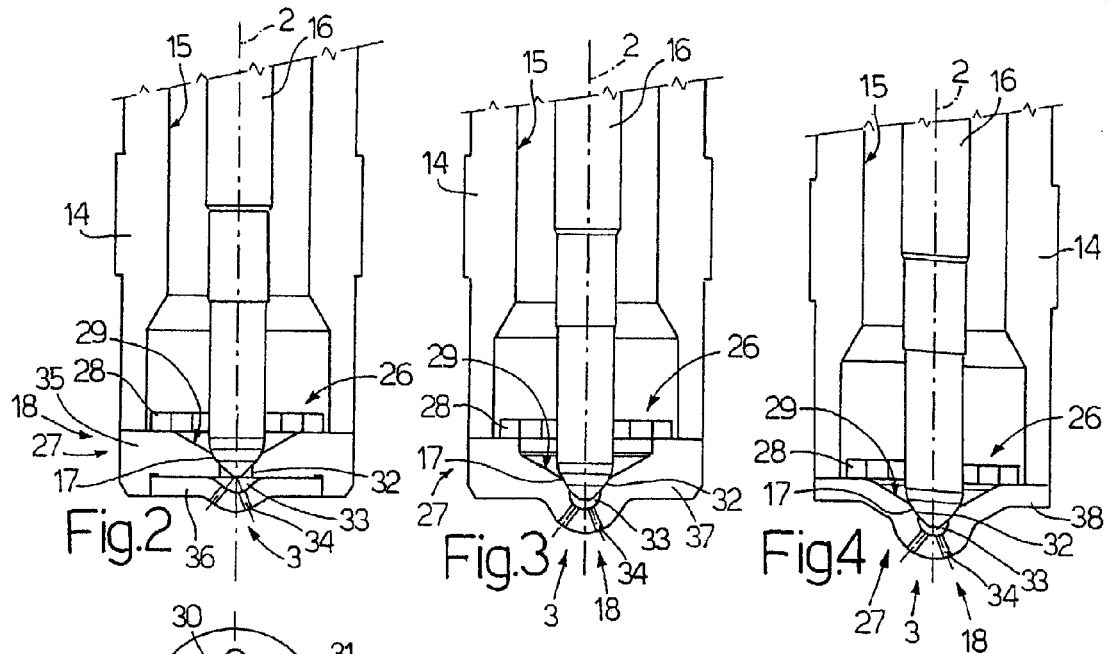
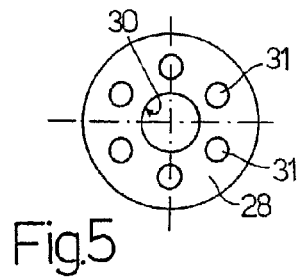
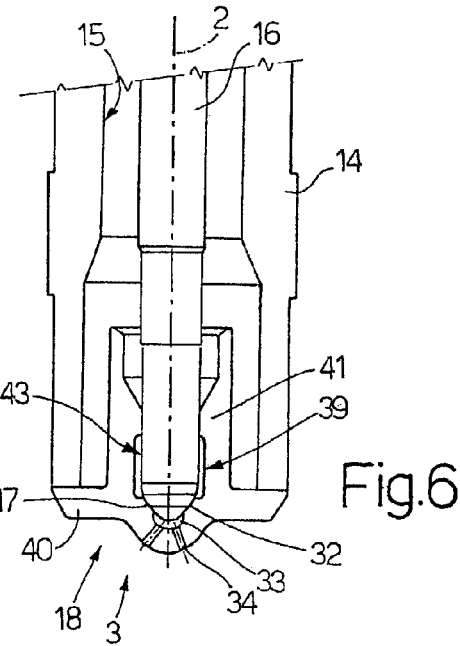
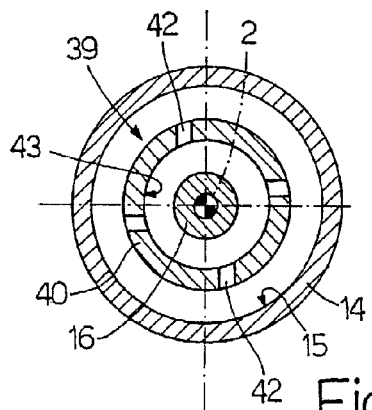

METHOD FOR CONTROLLING A FUEL INJECTOR ACCORDING TO A CONTROL LAW WHICH IS DIFFERENTIATED AS A FUNCTION OF INJECTION TIME

The present invention relates to a method for controlling a fuel injector.

The present invention is advantageously applied to controlling an electromagnetic injector in a direct petrol injection system, to which the following description will make explicit reference without consequently restricting the general scope thereof.

BACKGROUND OF THE INVENTION

It is known that an ideal injection system is perfectly linear, i.e. the flow rate at which the petrol is injected (given an identical pressure difference across the injector) is directly proportional to the injection time; thus, for an ideal injection system, the characteristic curve for injection time/flow rate of injected petrol is a straight line. A real injection system differs from the ideal injection system in that it tends to have zones of non-linear operation, i.e. zones of operation in which the characteristic curve for injection time/flow rate of injected petrol deviates from the ideal straight line; in particular, real injection systems have optimum linearity at long injection times, while they tend to move away from the ideal characteristics as injection times shorten.

A parameter known as dynamic range is used to characterise the degree of compliance with ideal linearity, said parameter expressing the ratio between the maximum injectable flow rate and the minimum injectable flow rate while keeping the deviation from the ideal straight line within a predetermined margin.

Known injection systems provide for the control of each electromagnetic injector by applying a relatively high voltage (approx. 70 volts) to the associated control coil for a first time interval (typically of less than 0.1 msec) in such a manner as to bring about a rapid rise in the current passing through the injector until a premagnetisation value is reached (indicatively of around 2 amps), which is maintained for a premagnetisation time of approx. 0.2 msec by cyclic switching (known as "chopping" in the art) of the voltage between zero and the maximum value; a relatively high voltage (approx. 70 volts) is then applied again for a second time interval (typically of less than 0.3 msec) during which the current passing through the injector reaches a peak value (approx. 10–12 amperes). Once the current passing through the injector has reached the peak value, the voltage across the injector is set to zero or even inverted (i.e. by applying −70 volts) so that the current is rapidly adjusted to a holding value (approx. 2 amperes), which is maintained until completion of the planned injection time by cyclic switching (known as "chopping" in the art) of the voltage between zero and a holding value (typically the battery voltage of 12 volts). At the end of the planned injection time, the current passing through the injector is set to zero by applying an inverse voltage to the elevated value (approx. −70 volts). Experimental testing has revealed that the injector opens shortly after reaching the peak current and closes after the current passing through the injector itself is set to zero. The delay between the current starting to flow through the injector itself and the injector actually opening and the delay between the current ceasing to flow through the injector itself and the injector actually closing have effects on the quantity of fuel injected, which tend to cancel each other out and that, being at a first approximation effects that are independent of injection time, have no impact upon the linearity of the injection time/flow rate of injected petrol relationship, but simply shift ("offset" in the art) this constant relationship relative to zero.

Various experimental tests have demonstrated that currently available electromagnetic petrol injectors controlled in accordance with the above-described method and operating at a pressure of 100 bar have dynamic range values lower than those obtained from the low-pressure (3–5 bar) injectors for indirect injection that are currently in production but, in order to ensure optimum functioning of a direct injection petrol engine, it is necessary to use an injection system that has a dynamic range of at least 12.

Currently available petrol injectors controlled in accordance with the above-described method have a relatively mediocre dynamic range in that, within a critical time interval between opening of the injector and reaching the holding value, the current passing through the injector varies very rapidly and a closure command issued within the critical interval can result in very different actual closure times depending upon the value for current prevailing at the moment at which the closure command is applied.

In an attempt to overcome the disadvantages described above, it has been proposed to use an electromagnetic injector provided with two coils and two respective independent control circuits; a main coil is used to open the injector, while an auxiliary coil is used only during the closure phase to accelerate closure of the injector. However, this solution is distinctly costly and complex since it provides for the addition of the auxiliary coil and the associated control circuit.

EP1201898 discloses a device for controlling fuel injection and comprising fuel pressure regulator means for adjusting fuel pressure of the fuel to be injected, injector drive means including an electromagnetic coil for opening the valve body of the injector, and injection control means for controlling the fuel regulator means and the injector drive means depending upon the operating conditions; the injection control means includes an injection timer for setting the exciting time for controlling the driving time for opening the valve body by controlling the exciting current and the exciting time for the electromagnetic coil, an over-excitation timer for feeding an over-exciting current, and an over-exciting period control unit for variably setting the initial count value of the over-excitation timer depending upon the fuel pressure. The over-exciting period is variably set to be a minimum required limit that increases with an increase in the fuel pressure.

EP0889223 discloses a method for detecting the switching time of an electrovalve; the method involves controlling the current flowing through the solenoid valve coil. In a first phase, the trip current is controlled at a defined value. During a second phase, a retaining current is controlled at a defined value. During a detection phase, when it is likely that the switching point will occur, the current is controlled at a detection value, which is smaller than the trip current and larger than the retaining current. The detection value is selected such that no saturation occurs. When the solenoid valve is used in a fuel injection system, the injection is divided into a pre-injection and a main injection. During the pre-injection, the current is controlled during the detection phase at the detection value. When the solenoid valve is used in a fuel injection system, the injection is divided into a pre-injection and a main injection. During the pre-injection, the current is controlled during the detection phase at the detection value.

EP0704096 discloses a system and method for operating high speed solenoid actuated devices such as electromagnetically operated high pressure fuel injectors requiring an initial high power boost to start the movement of an armature followed by a medium power boost to continue the movement of the armature to its end position and a low power control to hold the armature at its end position so that when the power is removed, the armature returns to its rest or beginning position. The system here details the logic and control necessary to provide six stages of power control, including both voltage and current control, to accomplish high speed operation both in moving the armature from its beginning to end position but also to return the armature from its end to its beginning position.

SUMMARY OF THE INVENTION

The object of the present invention is to provide a method for controlling a fuel injector that does not have the above-described disadvantages and, in particular, is simple and economic to implement and allows a relatively high dynamic range to be achieved.

BRIEF DESCRIPTION OF THE DRAWINGS

The present invention will now be described with reference to the attached drawings, which illustrate some non-limiting embodiments thereof, in which:

FIG. 3 is a magnified, sectional view of an end portion of a valve body in FIG. 1;

FIGS. 2 and 4 are magnified, sectional views of alternative embodiments in the valve body in FIG. 3;

FIG. 5 is a plan view of a disc defining part of a multihole atomiser present in the valve body in FIGS. 2, 3 and 4;

FIG. 6 is a magnified, sectional view of a further embodiment of the valve body in FIG. 2;

FIG. 7 is a magnified, sectional view of an element of the valve body in FIG. 6;

DETAILED DESCRIPTION OF THE INVENTION

Figure 1:
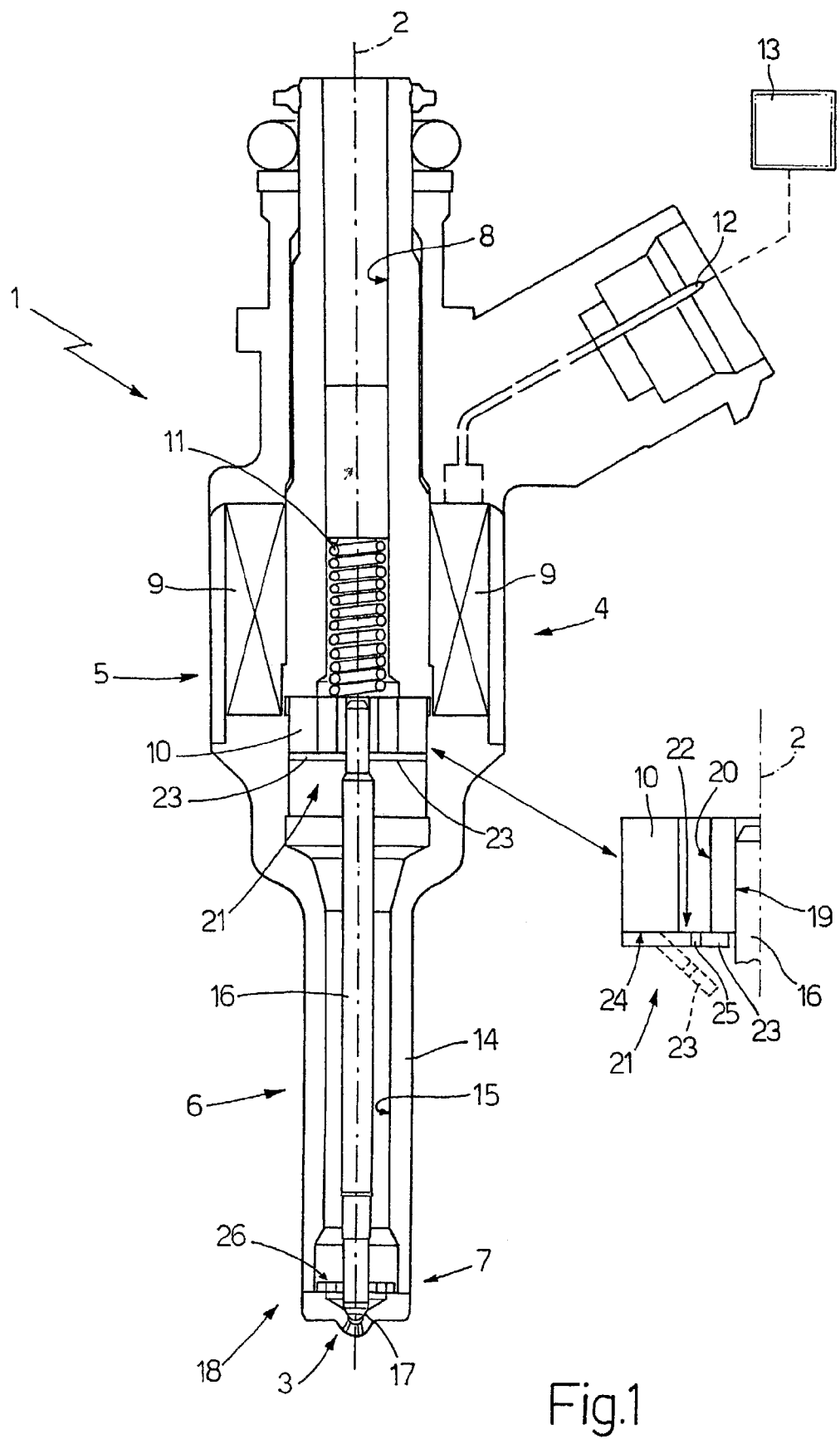
FIG. 1 is a schematic, partially sectional, side view of a fuel injector controlled according to the control method of the present invention.

In FIG. 1 the number 1 denotes the petrol injector as a whole, which is substantially cylindrically symmetrical around a longitudinal axis 2 and is capable of being operated so as to inject petrol from an associated injection nozzle 3. The injector 1 comprises an upper actuator body 4 accommodating an electromagnetic actuator 5, and a lower valve body 6, which is made integral with the actuator body 4 and accommodates a valve 7 actuated by the electromagnetic actuator 5 so as to control the flow of petrol from the injection nozzle 3; the actuator body 4 accommodates the electromagnetic actuator 5 and comprises an internal channel 8, which extends along the entire length of the actuator body 4 in order to supply pressurised petrol to the valve body 6.

The electromagnetic actuator 5 comprises an electromagnet 9, which is provided with a 36-turn winding having a resistance of approx. 0.12 Ohm, is integral with the actuator body 4 and is capable of displacing along the axis 2 an armature 10 of ferromagnetic material accommodated in a lower portion of the internal channel 8 from a closed position (illustrated in the attached figures) to an open position (not illustrated) against the action of a spring 11 that tends to keep the armature 10 in the closed position. Moreover, the electromagnet 9 is electrically connected by means of electric cables 12 to a control unit 13, which is capable of controlling the electromagnet 9 by applying across the electromagnet 9 a voltage v(t), variable over time, in order to cause a current i(t), variable over time, to pass through the electromagnet 9 itself and thus bring about the displacement of the armature 10 between said closed position and said open position.

The valve body 6 comprises a tubular container 14 that is substantially cylindrical and comprises a central cylindrical cavity 15, which accommodates a plug or plunger 16 comprising an upper portion integral with the armature 10 and co-operating with a valve seat 17 in order to control the flow of petrol from the injection nozzle 3, in a known manner. The cavity 15 extends along the entire length of the tubular container 14 and is closed at the bottom in a fluid-tight manner by a sealing element 18 in which the valve seat 17 is defined.

The armature 10 is cylindrical in shape (it is known in the art as a "button armature"), completely occupies a lower portion of the internal channel 8, comprises a central hole 19 occupied by an upper portion of the plunger 16 and a series of through-holes 20 distributed symmetrically around the central hole 19 to allow petrol to flow towards the valve body 6. The armature is accommodated in sliding manner inside the internal channel 8 so that it can be moved along the axis 2 between the stated open and closed positions by the force of the electromagnetic actuator 5; as a result of the above-described structure, the armature 10 also performs the function of an upper guide for the plunger 16, i.e. it helps to keep the plunger 16 aligned with the valve seat 17 and allows the plunger 16 itself to be displaced by the thrust of the electromagnetic actuator 5.

Moreover, the armature 10 is provided with an antirebound device 21 of the hydraulic type comprising respective valve elements 22, each of which is paired with a respective through-hole 20 of the armature 10 and has a different permeability to the passage of petrol depending upon the direction of passage of the petrol itself through the through-hole 20. In particular, each valve element 22 comprises a resilient sheet 23, which is in part fixed to a lower surface 24 of the armature 10 on only one side of the respective through-hole 20 and comprises a central hole 25 of smaller dimensions; when the petrol flows downwards, i.e. towards the valve seat 17, the sheet 23 deforms under the force of the petrol, allowing the petrol to flow substantially freely through the hole 20, while, when the petrol flows upwards, the sheet 23 is pressed against the lower surface 24 of the armature 10 by the force of the petrol, closing the hole 20 and only allowing the petrol to flow through the smaller dimension hole 25.

As is illustrated in FIGS. 2 to 5, the sealing element 18 is provided with a multihole atomiser 26, is cylindrically symmetrical around the longitudinal axis 2 and is of greater dimensions than those of the internal cavity 15 of the tubular container 14, such that it rests upon a lower surface of the tubular container 14; this type of construction is preferable because it makes it possible to carry out welding of the sealing element 18 and the tubular container 14 at the level of the side surface of the tubular container 14 itself and thus relatively remotely from the injection nozzle 3.

The sealing element 18 is composed solely of a cylindrically symmetrical main body 27, which comprises the valve seat 17 and ensures the fluid-tight closure of the lower end of the tubular container 14, and of a perforated disc 28, which is welded coaxially to the main body 27 and defines the multihole atomiser 26 in conjunction with an underlying truncated conical surface 29 defined in the main body 27.

In particular, the perforated disc 28 comprises a central through-hole 30 for passage of the plunger 16 and a series of peripheral through-holes 31 distributed symmetrically around the central hole 30 for passage of the petrol towards the underlying valve seat 17 located in the centre of the truncated conical surface 29; the plunger 16 occupies in sliding manner the central hole 30 of the perforated disc 28, which acts as a lower guide for the plunger 16.

The valve seat 17 comprises a central hole 32, which is connected coaxially to the truncated conical surface 9, is occupied in service by a pointed end portion of the plunger 16 so as to interrupt the flow of petrol, and opens into an injection chamber 33 comprising a number of free injection through-holes 34, which define the injection nozzle 3.

According to the embodiment illustrated in FIG. 2, the main body 27 is composed of a first element 35, which comprises the valve seat 17 and ensures fluid-tight closure of the lower end of the tubular container 14, and of a second element 36, which defines a lower wall of the injection chamber 33 provided with the injection holes 34. The first element 35 is obtained from a respective solid disc (not illustrated) processed by removal of material (typically by means of drilling and milling) or directly by forming, and the second element 36 is obtained from a respective solid disc (not illustrated) processed by forming.

According to the embodiment illustrated in FIG. 3, the main body 27 is composed of a single element 37 obtained from a respective solid disc (not illustrated) processed by removal of material (typically by means of drilling and milling). According to the embodiment illustrated in FIG. 4, the main body 27 is composed of a single element 38 obtained from a respective solid disc (not illustrated) processed by forming. Because of the structure thereof, production of the elements 37 and 38 is particularly simple and economic and makes it possible to reduce the production costs for the injector 1.

According to an alternative embodiment illustrated in FIGS. 6 and 7, the sealing element 18 is provided with a rotational atomiser 39 (capable of imparting rotational motion to the petrol flowing through the injection nozzle 3), is cylindrically symmetrical around the longitudinal axis 2 and is of greater dimensions than those of the internal cavity 15 of the tubular container 14, such that it rests upon a lower surface of the tubular container 14.

The sealing element 18 is composed of a single monolithic, cylindrically symmetrical body 40, which comprises the valve seat 17, the rotational atomiser 39 and a lower guide 41 of the plunger 16, and ensures fluid-tight closure of the lower end of the tubular container 14.

The rotational atomiser 39 is defined by a series of channels 42, which provide passage for the petrol from the internal cavity 15 to an intermediate chamber 43 and are arranged in offset manner so as to impart rotational motion to the petrol; the valve seat 17 comprising the central hole 32 is located in a lower part of the intermediate chamber 43, which central hole 32 is occupied in service by a pointed end portion of the plunger 16 to interrupt the flow of petrol, and opens into an injection chamber 33 comprising a number of free injection through-holes 34 that define the injection nozzle 3.

Figure 8:
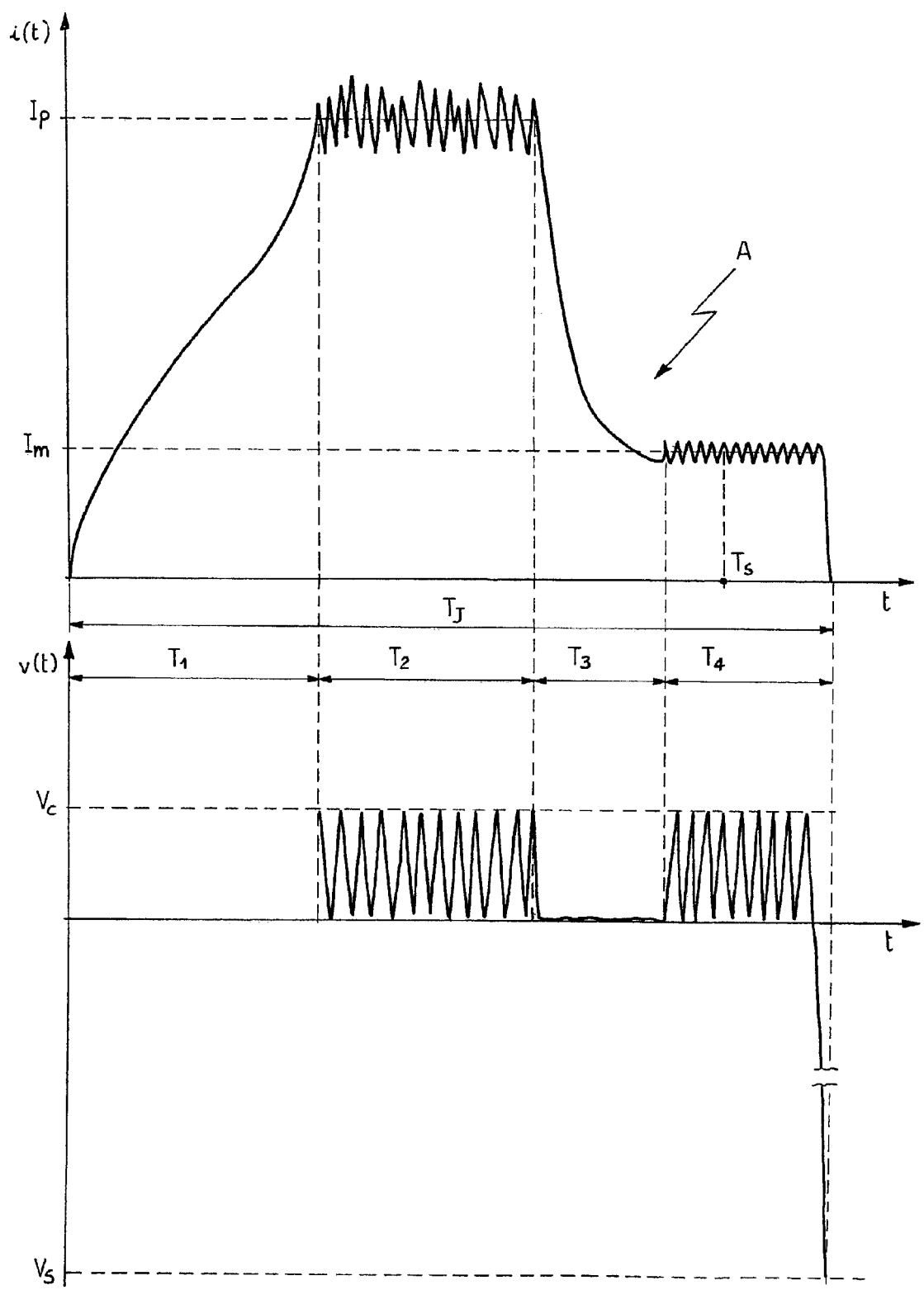
FIG. 8 shows the time profile for voltage and electric current passing through a control coil of the injector in FIG. 1 according to a first control principle.
Figure 9:
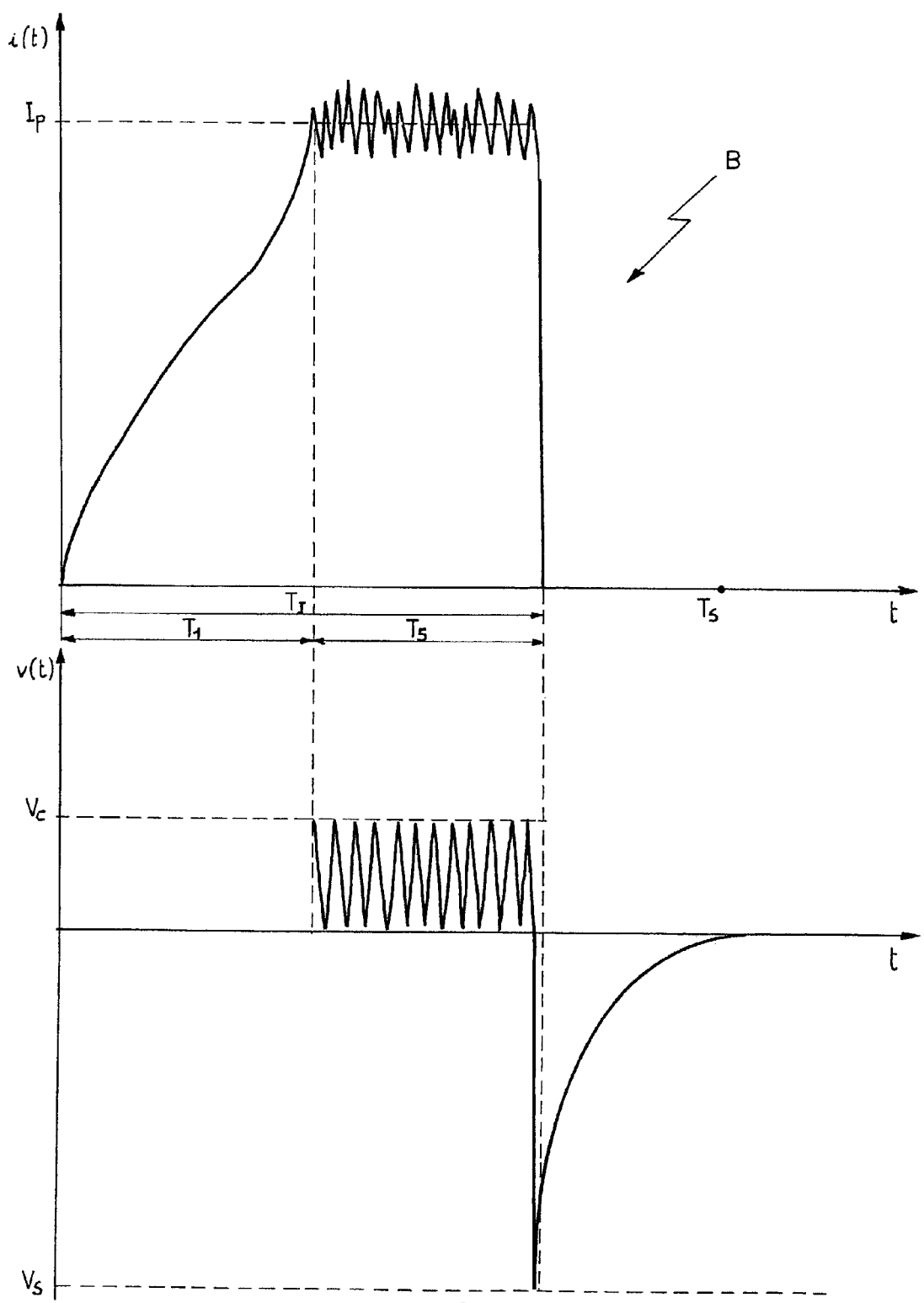
FIG. 9 shows the time profile for voltage and electric current passing through a control coil of the injector in FIG. 1 according to a second control principle.

With reference to FIGS. 8 and 9, the control principle used by the control unit 13 to control the electromagnet 9 of the electromagnetic actuator 5 is described below.

When in service, the control unit 13 determines in a known manner either the duration of the injection time Tj, i.e. the time interval for which the injector 1 must be held in its open position, or the moment of the start of the injection time Tj. On the basis of the value for the injection time Tj, the control unit 13 decides whether to control the electromagnet 9 with a current waveform A (illustrated in FIG. 8), or with a current waveform B (illustrated in FIG. 9); in particular, the electromagnet 9 is controlled with the current waveform A if the injection time Tj is greater than a predetermined threshold value Ts, while it is controlled with the current waveform B if the injection time Tj is less than the predetermined threshold value Ts.

As illustrated in FIG. 8, the current waveform A provides for a constant voltage v(t) equal to a control value Vc (typically of 12 volts, i.e. the battery voltage) to be applied to the electromagnet 9 from the moment of the start of the injection time Tj and for a time interval Ti (approx. 0.3–0.6 msec) in such a manner as to bring about a rise in the current i(t) passing through the electromagnet 9 from zero until it reaches a peak value Ip (of between 22 and 26 amperes). The peak value Ip is maintained for a time interval T2 (typically of 0.2–0.6 msec) by cyclic switching of the voltage v(t) applied to the electromagnet 9 between the control value Vc and zero, i.e. by "chopping" the voltage v(t) applied to the electromagnet 9 between the control value Vc and zero so as to maintain the current i(t) passing through the electromagnet 9 within a range more or less centred around the peak value Ip.

At the end of the time interval T2, the current i(t) passing through the electromagnet 9 is caused to drop for a time interval T3 (typically of 0.2–0.4 msec) until a holding value Im is reached (indicatively of between 4 and 8 amperes) by applying a zero voltage to the electromagnet 9; the holding value Im is maintained for a time interval T4 until the end of the injection time Tj (which is thus composed of the sum of T1, T2, T3 and T4) by cyclic switching of the voltage v(t) applied to the electromagnet 9 between the control value Vc and zero. At the end of the time interval T4, i.e. at the end of the injection time Tj, the current i(t) passing through the electromagnet 9 is rapidly set to zero by applying to the electromagnet 9 a constant negative voltage v(t) (i.e. of the opposite polarity to the voltage used to generate the current i(t)), which is equal to a defined shut-down value Vs (greater than 40 volts).

It is important to note that the predetermined threshold value Ts, and thus the injection time, is greater than the sum of T1, T2 and T3; in this manner, it is certain that the injector 1 is shut down from a defined moment during the time interval T4, at which the current i(t) passing through the electromagnet 9 has a substantially fixed value equal to the holding value Im.

As illustrated in FIG. 9, the current waveform B provides for a constant voltage v(t) equal to a control value Vc (typically of 12 volts, i.e. the battery voltage) to be applied to the electromagnet 9 from the moment of the start of the injection time Tj and for a time interval Ti (approx. 0.3–0.6 msec) in such a manner as to bring about a rise in the current i(t) passing through the electromagnet 9 from zero until it reaches a peak value Ip (of between 22 and 26 amperes). The peak value Ip is maintained for a time interval T5 until the end of the injection time Tj (which is thus composed of the sum of T1 and T5) by cyclic switching of the voltage v(t) applied to the electromagnet 9 between the control value Vc and zero. At the end of the time interval T5, i.e. at the end of the injection time Tj, the current i(t) passing through the electromagnet 9 is rapidly set to zero by applying to the electromagnet 9 a constant negative voltage v(t) (i.e. of the opposite polarity to the voltage used to generate the current i(t)), which is equal to a defined shut-down value Vs (greater than 40 volts). By operating as described above, it is certain that the injector 1 is shut down from a defined moment during the time interval T5, at which the current i(t) passing through the electromagnet 9 has a substantially fixed value equal to the peak value Ip (obviously for injection times Tj longer than the time interval T1).

From the above explanation, it is clear that the two current waveforms A and B share an identical initial part, during which the current passing through the electromagnet 9 is caused to rise for the time interval T1 until it reaches the peak value Ip, which is maintained respectively for the time interval T2 and for the time interval T5.

Experimental testing has demonstrated that the injector 1 controlled using the method described above has a dynamic range of greater than 11; this result is achieved thanks to the injector 1 always being shut down from a determined, known value for current i(t) passing through the electromagnet 9 (the peak value Ip if the injection time Tj is less than the threshold value Ts, the holding value Im if the injection time Tj is greater than the threshold value Ts). Shutting down the injector 1 from two different values for current i(t) passing through the electromagnet 9 is not problematic in that it introduces a deviation (offset) into the control system that is constant and is a function of the injection time Tj and is easily managed by the control unit 13.

Moreover, in controlling the electromagnet 9, the control unit 13 substantially uses zero voltage and the battery voltage Vc, i.e. the two voltages that are immediately available in a vehicle; the negative voltage Vs required for shut-down is used for very short time intervals (of the order of a few tens of μsec) and can thus be obtained using a Zener diode (not illustrated) of limited dimensions (since it is used for short time intervals, no significant quantities of energy need be dissipated at said diode). It is thus clear that the electronic control circuit (not illustrated) that is required to control the electromagnet 9 is particularly simple, economic and compact.

The control method described can be used with any type of electromagnetic injector; however, the control method described is particularly efficient in conjunction with the design of the injector 1, which uses a multihole atomiser instead of a rotational atomiser (also known as a swirl atomiser), in that, by using the multihole atomiser, favourable changes in pressure forces are achieved due to the pressure of the petrol, which improve the control efficiency of the injector described above. In other words, a rotational atomiser generates greater hydraulic forces opposing the actuation of the plunger than does a multihole atomiser, which forces, if they are to be counteracted effectively, require a very rapid rise in the current passing through the injector during the first part of the control curve, which rapid rise is not present in the injector control described above.

What is claimed is:

1. Method for controlling a fuel injector (1) for a controlled-ignition internal combustion engine provided with an electrically operated electromagnetic actuator (5) in such a manner as to open the injector (1) for a determined injection time (Tj); the method providing that the injector (1) be operated with a first current waveform (A) if the injection time (Tj) is greater than a predetermined threshold value (Ts), and that the injector (1) be operated with a second current waveform (B) if the injection time (Tj) is less than the predetermined threshold value (Ts); two current waveforms (A, B) sharing an identical initial part, during which the current (i(t)) passing through the injector (1) is caused to rise for a first time interval (T1) until it reaches a peak value (Ip), which is maintained for a second time interval (T2; T5) by cyclic switching of the voltage (v(t)) applied to the injector (1) between two different values (0, Vc); the method being characterized in that the second waveform (B) of the current (i(t)) provides for the current (i(t)) passing through the injector (1) to be maintained at the peak value (Ip) until the end of the injection time (Tj) and thus rapidly setting the current (i(t)) passing through the injector (1) itself to zero.

2. Method according to claim 1, wherein, during the shared initial part, the current (i(t)) passing through the injector (1) is caused to rise until it reaches a peak value (Ip) by applying to the injector (1) a constant voltage (v(t)), which is equal to the battery voltage (Vc).

3. Method according to claim 2, wherein, during the shared initial part, the current (i(t)) passing through the injector (1) is maintained at a value around the peak value (Ip) by cyclic switching of the voltage (v(t)) applied to the injector (1) between zero and the battery voltage (Vc).

4. Method according to claim 1, wherein the electromagnetic actuator (5) of the injector (1) comprises a 36-turn winding and the peak value (Ip) of the current (i(t)) passing through the injector (1) is between 22 and 26 amperes.

5. Method according to claim 1, wherein the current (i(t)) passing through the injector (1) is rapidly set to zero by applying to the injector (1) a negative voltage (v(t)) greater than 40 volts.

6. Method according to claim 1, wherein, at the end of the second time interval (T2), the first waveform (A) of the current (i(t)) provides for the current i(t) passing through the injector (1) to be caused to drop for a third time interval (T3) until it reaches a holding value (Im) that is maintained for a fourth time interval (T4) by cyclic switching of the voltage (v(t)) applied to the injector (1) between two different values (0, Vc).

7. Method according to claim 6, wherein the sum of the first, second and third time intervals (T1, T2, T3) is less than said predetermined threshold value (Ts) and thus less than the injection time (Tj).

8. Method according to claim 6, wherein the second time interval (T2) is of the order of 0.4 msec.

9. Method according to claim 6, wherein the current (i(t)) passing through the injector (1) is maintained at a value around the holding value (Im) by cyclic switching of the voltage (v(t)) applied to the injector (1) between zero and the battery voltage (Vc).

10. Method according to claim 6, wherein the electromagnetic actuator (5) of the injector (1) comprises a 36-turn winding and the holding value (Im) of the current (i(t)) passing through the injector (1) is between 4 and 8 amperes.

11. Method according to claim 6, wherein the current (i(t)) passing through the injector (1) is caused to drop from the peak value (Ip) to the holding value (Im) by applying a zero voltage (v(t)) to the injector (1).

12. Method according to claim 6, wherein, at the end of the injection time (Tj), the current (i(t)) passing through the injector (1) is rapidly set to zero.

13. Method according to claim 12, wherein the current (i(t)) passing through the injector (1) is rapidly set to zero by applying to the injector (1) a negative voltage (v(t)) that, in absolute terms, is greater than the battery voltage (Vc).

14. Method according to claim 13, wherein the current (i(t)) passing through the injector (1) is rapidly set to zero by applying to the injector (1) a negative voltage (v(t)) greater than 40 volts.

15. Method according to claim 1, wherein the fuel injector (1) is provided with a valve body (6), which comprises a valve (7) capable of controlling the flow of fuel and a cylindrical, tubular container (14) comprising a central cylindrical cavity (15); the valve body (6) furthermore comprising a sealing element (18), which is arranged so as to close a lower end of the tubular container (14) and is provided with a multihole atomiser (26) and a valve seat (17), and a plunger (16), which is capable of occupying the valve seat (17), is accommodated in sliding manner within the tubular container (14), and is set in motion by the electromagnetic actuator (5) in order to open and close the injector (1); the sealing element (18) being composed solely of a cylindrically symmetrical main body (27), which comprises the valve seat (17) and ensures fluid-tight closure of the lower end of the tubular container (14), and of a perforated disc (28), which is welded coaxially to the main body (27) and defines the multihole atomiser (26) in conjunction with an underlying truncated conical surface (29) defined in the main body (27).

16. Method according to claim 15, wherein the electromagnetic actuator (5) comprises a fixed coil and a mobile cylindrical armature (10) that is attached mechanically to an upper part of the plunger (16).

17. Method according to claim 16, wherein an upper guide of the plunger (16) is defined by the armature (10) and a lower guide of the plunger is defined by the atomiser (26).

18. Method according to claim 16, wherein the injector (1) comprises an internal channel (8) through which the fuel is supplied to the valve seat (17); the internal channel (8) being completely occupied by the armature (10), which comprises at least one supply through-hole (20) for passage of fuel towards the valve seat (17) and is provided with an antirebound device (21) of the hydraulic type.

19. Method according to claim 18, wherein the antirebound device (21) of the hydraulic type comprises a valve element (22), which is paired with the supply hole (20) of the armature (10) and has a different permeability to the passage of fuel depending upon the direction of passage of the fuel itself through the supply hole (20).

20. Method according to claim 15, wherein the perforated hole (28) comprises a central through-hole (30) for passage of the plunger (16) and a series of peripheral through-holes (31) distributed symmetrically around the central hole (30) for passage of the fuel towards the underlying valve seat (17).

21. Method according to claim 15, wherein the valve seat (17) comprises a central hole (32), which is occupied by the plunger (16) and opens into an injection chamber (33) comprising a number of free injection through-holes (34), which define an injection nozzle (3).

22. Method according to claim 21, wherein the cylindrically symmetrical main body (27) is composed of a first element (35), which comprises the valve seat (17) and ensures fluid-tight closure of the lower end of the tubular container (14) and of a second element (36), which defines a lower wall of the injection chamber (33) provided with the injection holes (34).

23. Method according to claim 22, wherein the first element (35) is obtained from a respective solid disc processed by removal of material or directly by forming, and the second element (36) is obtained from a respective solid disc processed by forming.

24. Method according to claim 21, wherein the cylindrically symmetrical main body (27) is composed of a single element (37) obtained from a respective solid disc processed by removal of material.

25. Method according to claim 21, wherein the cylindrically symmetrical main body (27) is composed of a single element (38) obtained from a respective solid disc processed by forming.

26. Method according to claim 1, wherein the fuel injector (1) is provided with a valve body (6), which comprises a valve (7) capable of controlling the flow of fuel and a cylindrical, tubular container (14) comprising a central cylindrical cavity (15); the valve body (6) furthermore comprising a sealing element (18) that is arranged so as to close a lower end of the tubular container (14) and is provided with a rotational atomiser (39) and a valve seat (17), and a plunger (16), which is capable of occupying the valve seat (17), is accommodated in sliding manner within the tubular container (14), and is set in motion by the electromagnetic actuator (5) in order to open and close the injector (1); the sealing element (18) being composed of a single monolithic body (40), which comprises the valve seat (17), ensures fluid-tight closure of the lower end of the tubular container (14) and defines the rotational atomiser (39) and a lower guide (41) of the plunger (16).

27. Method according to claim 26, wherein the rotational atomiser (39) is defined by a series of channels (42) that provide passage for the petrol from an internal cavity (15) of the tubular container (14) to an intermediate chamber (43) and are arranged in offset manner so as to impart rotational motion to the fuel.

28. Method according to claim 27, wherein the valve seat (17) comprising a central hole (32) is located in a lower part of the intermediate chamber (43), which central hole (32) is occupied in service by a pointed end portion of the plunger (16) so as to interrupt the flow of fuel.

29. Method according to claim 28, wherein the central hole (32) of the valve seat (17) opens into an injection chamber (33) comprising a number of free injection through-holes (34) that define an injection nozzle (3).

* * * * *